Patented July 12, 1932

1,866,732

UNITED STATES PATENT OFFICE

CYRIL J. STAUD AND JAMES T. FUESS, OF ROCHESTER, NEW YORK, ASSIGNORS TO EASTMAN KODAK COMPANY, OF ROCHESTER, NEW YORK, A CORPORATION OF NEW YORK

LUBRICANT CONTAINING CELLULOSE ACETATE

No Drawing. Application filed December 24, 1930. Serial No. 504,633.

This invention relates to a lubricant and more particularly to a lubricating compound containing acetone soluble cellulose acetate which is adapted to withstand the higher temperatures without breakdown.

Lubricants are normally made by compounding various high boiling fractions of crude oil. Lubricants are also compounded from vegetable and animal fats or oils but to our knowledge no one has ever prepared a lubricant which includes cellulose acetate in its composition.

We have found it possible to prepare a lubricant which has the exceptional advantage of withstanding the higher temperatures under which lubricants are expected to operate by dissolving cellulose acetate in a mixture of diethyl phthalate and ethyl lactate. As an alternative method of preparation, the cellulose acetate may be first moistened with ethyl lactate and then dissolved by the addition of diethyl phthalate in any suitable quantity.

The cellulose acetate employed by us is preferably of the acetone soluble variety having an acetyl content ranging between about 36.5% and 41.5% and having a viscosity in acetone (1 to 4) of anywhere from 5 to 500 seconds as determined by the falling ball method. If the acetone soluble cellulose acetate is to be dissolved directly in the diethyl phthalate-ethyl lactate mixture we employ approximately equal parts of the diethyl phthalate and ethyl lactate in preparing the mixture. In any event the proportion of ethyl lactate to diethyl phthalate should not be less than 3 to 7, when dissolving the cellulose acetate in the mixture, as otherwise a good solution of the cellulose acetate will not be obtained.

As an example of the preparation of our novel lubricant we may dissolve 100 parts of acetone soluble cellulose acetate, having an acetyl content of approximately 40% and a viscosity of approximately 100 seconds, in approximately 300 c. c. of a mixture of about equal parts by volume of diethyl phthalate and ethyl lactate. This will give a lubricant which has sufficient body for a number of purposes and which will withstand temperatures in the neighborhood of 250 to 300 degrees C. without any material breakdown of the lubricant.

As an alternative method of preparation we may moisten 100 parts of acetone soluble cellulose acetate of approximately 40% acetyl value and 100 seconds viscosity, with from 50 to 75 c. c. of ethyl lactate, following which diethyl phthalate may be added to obtain solution of the cellulose acetate. The striking feature of this alternative is that after the acetone soluble cellulose acetate is once moistened with the ethyl lactate, the diethyl phthalate may be added in any quantity desired and solution of the cellulose acetate still be obtained. In other words, by first moistening the cellulose acetate with ethyl lactate there may be added diethyl phthalate in an amount which is more than sufficient to exceed the ratio 7 parts of diethyl phthalate to 3 parts of ethyl lactate. By this procedure diethyl phthalate may merely be added until the composition has the desired viscosity or fluidity.

Another striking thing about our invention is that diethyl phthalate when taken alone is a non-solvent for cellulose acetate, but when taken with small quantities of ethyl lactate as herein described becomes a solvent for the acetone soluble cellulose acetate and thereby produces a lubricant which has many useful properties.

Obviously the example above given is only illustrative of certain embodiments of our invention and we are not to be restricted thereby. We have given the approximate ranges of the constituents of our invention and those skilled in the art will readily understand the adaptation of the invention to the varied conditions for which any particular lubricant may need to be prepared.

What we claim as our invention and desire to be secured by Letters Patent of the United States is:

1. A lubricant comprising acetone soluble cellulose acetate, diethyl phthalate and ethyl lactate.

2. A lubricant which comprises acetone soluble cellulose acetate dissolved in a mixture consisting of approximately equal parts of diethyl phthalate and ethyl lactate.

3. A lubricant comprising approximately 100 parts of acetone soluble cellulose acetate and approximately 200 parts of a mixture consisting of about equal parts of diethyl phthalate and ethyl lactate.

4. A method of preparing a lubricant which comprises moistening acetone soluble cellulose acetate with ethyl lactate and then adding diethyl phthalate in an amount sufficient to dissolve the cellulose acetate.

5. A composition of matter consisting of acetone soluble cellulose acetate, diethyl phthalate and ethyl lactate.

6. A composition of matter consisting of acetone soluble cellulose acetate and a mixture of approximately equal parts of diethyl phthalate and ethyl lactate.

Signed at Rochester, N. Y., this 15th day of December, 1930.

CYRIL J. STAUD.
JAMES T. FUESS.